US010050258B2

(12) United States Patent
Shin et al.

(10) Patent No.: US 10,050,258 B2
(45) Date of Patent: Aug. 14, 2018

(54) ACTIVE MATERIAL FOR ALL-SOLID LITHIUM SECONDARY BATTERY, METHOD FOR MANUFACTURING SAME, AND ALL-SOLID LITHIUM SECONDARY BATTERY COMPRISING SAME

(71) Applicant: IUCF-HYU (INDUSTRY-UNIVERSITY COOPERATION FOUNDATION HANYANG UNIVERSITY), Seoul (KR)

(72) Inventors: Dong Wook Shin, Seongnam-si (KR); Junghoon Kim, Seoul (KR); Woosup Kim, Daegu (KR); Sun Ho Choi, Incheon (KR); Youngmin Lee, Incheon (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 49 days.

(21) Appl. No.: 15/100,130

(22) PCT Filed: Nov. 27, 2014

(86) PCT No.: PCT/KR2014/011508
§ 371 (c)(1),
(2) Date: May 27, 2016

(87) PCT Pub. No.: WO2015/080502
PCT Pub. Date: Jun. 4, 2015

(65) Prior Publication Data
US 2017/0309890 A1 Oct. 26, 2017

(30) Foreign Application Priority Data
Nov. 29, 2013 (KR) .......................... 10-2013-0147782

(51) Int. Cl.
*H01M 4/131* (2010.01)
*H01M 10/0525* (2010.01)
(Continued)

(52) U.S. Cl.
CPC ....... *H01M 4/131* (2013.01); *H01M 10/0525* (2013.01); *C01D 15/02* (2013.01); *C01D 15/08* (2013.01); *H01M 10/0562* (2013.01)

(58) Field of Classification Search
CPC ... C01D 15/02; C01D 15/08; H01M 10/0525; H01M 10/0562; H01M 4/131
See application file for complete search history.

(56) References Cited

U.S. PATENT DOCUMENTS 5,783,328 A * 7/1998 Wang ................. C01G 45/1242
423/599
6,045,771 A * 4/2000 Matsubara ............ H01M 4/525
423/594.4
(Continued)

FOREIGN PATENT DOCUMENTS

CN 101828286 9/2010
JP 2000-251938 A 9/2000
(Continued)

OTHER PUBLICATIONS

International Search Report dated Mar. 9, 2015 in PCT/KR2014/011508 Filed Nov. 27, 2014.
(Continued)

*Primary Examiner* — Carlos Barcena
(74) *Attorney, Agent, or Firm* — Oblon, McClelland, Maier & Neustadt, L.L.P.

(57) ABSTRACT

The present invention relates to an oxide active material surface-treated with a lithium compound, a method for preparing the same, and an all-solid lithium secondary battery capable of effectively suppressing an interface reaction in a solid electrolyte by adopting the same. In the all-solid lithium secondary battery comprising an electrode containing a positive electrode active material and a sulfide-based solid electrolyte, the positive electrode active material according to the present invention can significantly improve battery characteristics since a coating layer formed of a lithium compound is formed while surrounding a particle surface to act as a functional coating layer which suppresses the interface reaction of the sulfide-based solid electrolyte and the electrode. In addition, in cases where the active material is synthesized and coated with a lithium compound at the same time, a lithium salt and a transition metal salt are dissolved in a solvent through stirring, to prepare a solution, followed by drying and heat treatment, and here, the prepared active material has a form in which a mixture generated from an excessive amount of lithium salt which is synthesized and then remains on the particle surface having a structure capable of absorbing and releasing lithium is coated on the particle surface to form a coating layer. In addition, in cases where the previously synthesized active material is coated with a lithium compound, the active material and a lithium salt are dissolved in a solvent through stirring, followed by drying and heat-treatment, and here, the prepared active material has a form in which a mixture generated from an excessive amount of lithium salt which is synthesized and then remains on the particle surface having a structure capable of absorbing and releasing lithium is coated on the particle surface to form a coating layer.

9 Claims, 7 Drawing Sheets

(51) Int. Cl.
  *H01M 10/0562* (2010.01)
  *C01D 15/08* (2006.01)
  *C01D 15/02* (2006.01)

(56) References Cited

U.S. PATENT DOCUMENTS

| | | | |
|---|---|---|---|
| 9,023,531 B2 | 5/2015 | Ueki et al. | |
| 2004/0223906 A1* | 11/2004 | Wang | C01G 53/42 423/594.4 |
| 2010/0216030 A1 | 8/2010 | Maeda | |
| 2010/0221613 A1 | 9/2010 | Ueki et al. | |
| 2012/0021298 A1 | 1/2012 | Maeda | |
| 2012/0107686 A1 | 5/2012 | Ryu et al. | |
| 2013/0052492 A1* | 2/2013 | Schaefer | H01M 2/1646 429/50 |
| 2014/0087270 A1* | 3/2014 | Yoshida | H01M 4/485 429/304 |

FOREIGN PATENT DOCUMENTS

| | | |
|---|---|---|
| JP | 2004119110 A | 4/2004 |
| JP | 2004-281253 A | 10/2004 |
| JP | 2005-310744 A | 11/2005 |
| JP | 2012-28231 A | 2/2012 |
| JP | 2013177288 A | 9/2013 |
| KR | 20060045560 A | 5/2006 |
| KR | 10-2010-0095349 | 8/2010 |
| KR | 10-2010-0102382 | 9/2010 |
| WO | 2012/160698 A1 | 11/2012 |

OTHER PUBLICATIONS

Atsushi Sakuda et al., "Interfacial Observation Between $LiCoO_2$ Electrode and $Li_2S$—$P_2S_5$ Solid Electrolytes of All-Solid-State Lithium Secondary Batteries Using Transmission Electron Microscopy". *CHemistry of Materials,* vol. 22., 2010., pp. 949-956.

Search Report dated Oct. 13, 2017, in corresponding Chinese Patent Application No. 2014800654140 with English translation.

\* cited by examiner

ACTIVE MATERIAL FOR ALL-SOLID LITHIUM SECONDARY BATTERY, METHOD FOR MANUFACTURING SAME, AND ALL-SOLID LITHIUM SECONDARY BATTERY COMPRISING SAME

TECHNICAL FIELD

The present invention relates to an active material for an all-solid-state lithium secondary battery that has excellent cycle characteristics and high-rate characteristics. More specifically, the present invention relates to an active material in which an oxide active material is surface treated with a lithium compound, methods for preparing the active material, and an all-solid-state lithium secondary battery that employs the active material to effectively suppress interfacial reactions in a solid electrolyte.

BACKGROUND ART

Lithium ion secondary batteries using organic liquid electrolytes have been widely used in small electronic devices due to their excellent characteristics in terms of energy and power densities over other energy storage units.

In recent years, the application of lithium ion secondary batteries using organic liquid electrolytes has been rapidly extended to medium and large energy storage devices as well as small electronic devices. However, leakage of liquid electrolytes increases the risk of explosion or fire. Attention has thus focused on safe electrolyte materials free from any risk of explosion or fire. Under these circumstances, considerable research has been conducted on all-solid-state lithium secondary batteries using nonflammable inorganic solid electrolytes. Oxide, halide, and sulfide solid electrolytes are the most actively investigated inorganic solid electrolytes for all-solid-state lithium secondary batteries. Particularly, sulfide solid electrolytes have received attention as the most promising materials because of their superior lithium ion conductivity.

However, when a sulfide solid electrolyte comes into contact with an oxide active material that is widely in use, undesirable reactions may occur at the interface between the electrolyte and the active material. For example, a resistive layer may be formed by diffusion of the metal elements or a lithium depletion layer may be formed due to different potentials. Such interfacial reactions cause markedly increased interfacial resistance, leading to significant deterioration of cycle characteristics and high-rate characteristics.

Many attempts have been made to suppress interfacial side reactions between sulfide solid electrolytes and oxide active materials and to achieve improved cycle characteristics and high-rate characteristics. A recent report has shown that the formation of a coating layer composed of a transition metal oxide, such as $Al_2O_3$, $ZrO$ or $SiO_2$, a lithium transition metal oxide, such as $Li_4Ti_5O_{12}$ or $LiNbO_3$, an oxide, such as $Li_2O$—$SiO_2$ or a transition metal sulfide, such as NiS or CoS, on the surface of an oxide active material represented by $Li_{1+x}(M)O_2$ (where M includes at least one transition metal selected from Co, Mn, and Ni and x is from 0 to 1) can suppress side reactions, such as the formation of a resistive layer by diffusion of the metal elements or the formation of a lithium depletion layer due to different potentials.

However, active material coating techniques for suppressing interfacial reactions suffer from limitations in that additional coating processes using starting materials containing metal elements incurs high costs, compositions of coating materials are difficult to precisely control, and optimization of the diffusion coefficient of lithium ions in coating materials requires complex coating process conditions. Such variables greatly limit the choice of suitable coating materials. Thus, there is a need to develop coating materials more suitable for use in all-solid-state batteries and techniques for preparing the coating materials.

DETAILED DESCRIPTION OF THE INVENTION

Problems to be Solved by the Invention

Therefore, the present invention is intended to provide a cathode active material for an all-solid-state lithium secondary battery that can effectively suppress interfacial reactions between a sulfide solid electrolyte and the electrode, achieving improved battery performance.

The present invention is also intended to provide an all-solid-state lithium secondary battery including the cathode active material.

The present invention is also intended to provide methods for preparing the cathode active material.

Means for Solving the Problems

One aspect of the present invention provides a cathode active material for an all-solid-state lithium secondary battery, including an oxide represented by Formula 1:

$$Li_{1+x}(M)O_2 \qquad \text{[Formula 1]}$$

wherein M includes at least one transition metal selected from Co, Ni, and Mn and X satisfies 0<X<1, preferably 0.10<X<0.20, and a lithium compound coating layer surrounding the surface of the oxide particles.

The lithium compound coating layer is composed of at least one lithium compound selected from lithium salts, including lithium hydroxide (LiOH), and lithium carbonate ($Li_2CO_3$).

A further aspect of the present invention provides an all-solid-state lithium secondary battery including a sulfide solid electrolyte and an electrode wherein the electrode includes the cathode active material.

Another aspect of the present invention provides a method for preparing the cathode active material by forming a lithium compound coating layer on an oxide active material simultaneously with the synthesis of the oxide active material and a method for preparing the cathode active material by forming a lithium compound coating layer on a synthesized oxide active material through a secondary process. The formation of the lithium compound coating layer in the cathode active material suppresses the formation of a resistive layer by diffusion of the transition metal element from the oxide active material or the formation of a lithium depletion layer due to different potentials during fabrication of a battery and can increase the contact area between the active material and an electrolyte to induce large diffusion paths of lithium ions, which cannot be expected in an active material including no surface coating layer.

Specifically, the former method for preparing the cathode active material includes:

(a) mixing a lithium precursor with a metal salt in a molar ratio of 1.10-1.50:1 and dissolving the mixture in distilled water to obtain a mixed solution;

(b) drying the mixed solution with stirring under heating to evaporate the solvent; and (c) baking the dried product at 600 to 1000° C.

In the cathode active material prepared by the method, the surface of an oxide active material is surrounded by a lithium compound coating layer, which is formed simultaneously with the synthesis of the oxide active material.

According to one embodiment of the present invention, the lithium precursor may be selected from lithium nitrate, lithium hydroxide, lithium citrate, lithium acetate, lithium sulfate, and lithium carbonate and the metal salt may be selected from nitrates, acetates, and citrates of transition metals, including Co, Ni, and Mn, and mixtures thereof.

According to one embodiment of the present invention, step (b) may be carried out at a temperature of 40 to 250° C.

According to one embodiment of the present invention, the lithium compound coating layer may be composed of at least one lithium compound selected from lithium salts, including lithium hydroxide (LiOH), and lithium carbonate ($Li_2CO_3$). Preferably, the lithium compound is lithium carbonate ($Li_2CO_3$). The lithium carbonate may be formed when the baking is performed in a carbon dioxide ($CO_2$) or $CO_2$-containing gas atmosphere in step (c).

The latter method for preparing the cathode active material by forming a lithium compound coating layer on a synthesized oxide active material through a secondary process includes:

(a) dissolving a lithium precursor with stirring in water to obtain a lithium precursor solution;

(b) dispersing an oxide active material represented by Formula 1:

$$Li_{1+x}(M)O_2 \quad \text{[Formula 1]}$$

wherein M includes at least one transition metal selected from Co, Ni, and Mn and X satisfies 0<X<1, in the lithium precursor solution;

(c) drying the mixed solution, followed by baking at 600 to 1000° C.

The surface of the oxide active material is surrounded by the lithium compound coating layer.

According to one embodiment of the present invention, the lithium precursor may be selected from lithium nitrate, lithium hydroxide, lithium citrate, lithium acetate, lithium sulfate, and lithium carbonate and the lithium compound coating layer may be composed of at least one lithium compound selected from lithium salts, including lithium hydroxide (LiOH), and lithium carbonate ($Li_2CO_3$).

Effects of the Invention

The cathode active material of the present invention has a structure in which a coating layer composed of a lithium compound surrounds the surface of oxide particles. This structure allows the coating layer to act as a functional layer to suppress interfacial reactions between a sulfide solid electrolyte and the electrode, achieving markedly improved battery performance.

In addition, the cathode active material of the present invention is prepared by forming a lithium compound coating layer on an oxide active material simultaneously with the synthesis of the oxide active material or by forming a lithium compound coating layer on a synthesized oxide active material through a secondary process. The formation of the coating layer suppresses the formation of a resistive layer by diffusion of the transition metal element from the oxide active material or the formation of a lithium depletion layer due to different potentials during charge/discharge in the course of battery fabrication and can increase the contact area between the active material and an electrolyte to induce large diffusion paths of lithium ions, which cannot be expected in an active material including no surface coating layer.

Furthermore, the method for preparing the cathode active material by forming a lithium compound coating layer on an oxide active material simultaneously with the synthesis of the oxide active material according to the present invention avoids the need for additional subsequent processing for forming the coating layer to suppress interfacial reactions, contributing to a reduction in the number of processing steps.

BEST MODE FOR CARRYING OUT THE INVENTION

The present invention will now be described in more detail.

The present invention is directed to a cathode active material in which an oxide active material is surface treated with a lithium compound, methods for preparing the active material, and an all-solid-state lithium secondary battery employing the active material to effectively suppress interfacial reactions in a solid electrolyte.

The all-solid-state lithium secondary battery of the present invention includes an electrode and a sulfide solid electrolyte wherein the electrode includes the cathode active material. The cathode active material has a structure in which a coating layer composed of a lithium compound surrounds the surface of oxide particles. This structure allows the coating layer to act as a functional layer to suppress interfacial reactions between the sulfide solid electrolyte and the electrode, achieving greatly improved battery performance.

In a conventional lithium secondary battery system using a liquid electrolyte, secondary phase materials, such as lithium carbonate, or impurities formed on the surface of an active material during preparation of the active material may undergo side reactions with the liquid electrolyte during charge/discharge. Such side reactions cause poor battery performance. There is thus a need to minimize the amount of impurities by washing or high-temperature baking after synthesis of the active material.

In the present invention, an excess of a lithium source is added to prepare an oxide active material and a coating layer composed of impurities from remaining lithium source is formed on the surface of the oxide active material. The coating layer acts as a functional layer to suppress interfacial reactions with a sulfide solid electrolyte, which cannot be expected in the conventional liquid electrolyte system.

The active material of the present invention may be prepared by coating an oxide active material with a lithium compound simultaneously with the synthesis of the oxide active material. In this case, the active material of the present invention is prepared by dissolving a lithium salt and a transition metal salt with stirring in a solvent, drying the solution, and baking the dried product. The active material has a structure in which a mixture produced from the excess lithium salt remaining after synthesis is coated on the surface of the oxide particles capable of intercalation and deintercalation of lithium to form a coating layer.

Alternatively, the active material of the present invention may be prepared by coating a lithium compound on a synthesized oxide active material. In this case, the active material of the present invention is prepared by dissolving a synthesized oxide active material and a lithium salt with stirring in a solvent, drying the solution, and baking the dried product. The active material has a structure in which a mixture produced from the excess lithium salt remaining after synthesis is coated on the surface of the oxide particles capable of intercalation and deintercalation of lithium to form a coating layer.

Therefore, the lithium compound coating layer formed on the surface of the oxide active material suppresses interfacial reactions with a sulfide solid electrolyte, so that the formation of a resistive layer by diffusion of the transition metal element from the oxide active material or the formation of a lithium depletion layer due to different potentials during fabrication of the battery can be suppressed and the contact area between the active material and the electrolyte can be increased to induce large diffusion paths of lithium ions.

One aspect of the present invention provides an active material for an all-solid-state lithium secondary battery using a sulfide solid electrolyte that can suppress interfacial reactions between an electrode and the sulfide solid electrolyte to ensure excellent cycle characteristics and high-rate characteristics, achieving improved battery performance.

Specifically, the active material includes an oxide represented by Formula 1:

[Formula 1]

wherein M includes at least one transition metal selected from Co, Ni, and Mn and X satisfies 0<X<1, preferably 0.10<X<0.20, and a lithium compound coating layer surrounding the surface of the oxide particles.

The lithium compound coating layer is composed of at least one lithium compound selected from lithium salts, including lithium hydroxide (LiOH), and lithium carbonate (Li$_2$CO$_3$). The coating layer may be composed of a lithium salt selected from lithium nitrate, lithium hydroxide, lithium citrate, lithium acetate, lithium sulfate, and lithium carbonate.

A further aspect of the present invention is directed to methods for preparing the active material whose composition, structure, and characteristics have been described above.

Specifically, one of the methods is associated with the coating of an oxide active material with a lithium compound simultaneously with the synthesis of the oxide active material. According to this method, the active material is prepared by dissolving a lithium salt and a transition metal salt with stirring in a solvent, drying the solution, followed by baking. The active material has a structure in which a mixture produced from the excess lithium salt remaining after synthesis is coated on the surface of the oxide particles capable of intercalation and deintercalation of lithium to form a coating layer.

Another method is associated with the coating of a synthesized oxide active material with a lithium compound. According to this method, the active material is prepared by dissolving an oxide active material and a lithium salt with stirring in a solvent, drying the solution, followed by baking. The active material has a structure in which a mixture produced from the excess lithium salt remaining after synthesis is coated on the surface of the oxide particles capable of intercalation and deintercalation of lithium to form a coating layer.

The lithium salt is not limited to a particular kind and may be selected from lithium nitrate, lithium hydroxide, lithium citrate, lithium acetate, lithium sulfate, and lithium carbonate. The transition metal salt is also not limited to a particular kind and may be selected from Co, Ni, Mn, and mixtures thereof depending on the desired voltage and capacity of a final battery.

The mixed solution of the lithium salt and the transition metal salt may be prepared by separately preparing a lithium salt solution and a transition metal salt solution and adding the transition metal salt solution portionwise to the lithium salt solution or vice versa. Alternatively, the mixed solution may be prepared by dissolving the lithium salt and the transition metal salt in one solvent.

The methods of the present invention are based on the use of precursor solutions. However, the methods are merely illustrative and the active material may be synthesized from other starting materials by suitable synthetic processes, such as solid-state processes. The methods are not particularly limited so long as by-products can be formed on the surface of the oxide active material by the addition of excess lithium.

The degree of coating with by-products produced from an excess of a lithium source on the surface of the oxide active material is controlled by the amount of the lithium source added.

The lithium source is added in such an amount that the ratio Li/Co is from 1.0 to 1.5. The stirring time and temperature conditions are not specially limited so long as the salts can be sufficiently homogeneously dissolved and then the solvent can be removed by evaporation.

After stirring, the solution is dried at a temperature of at least 40° C. at which the solvent can be sufficiently removed. Thereafter, baking is performed at a temperature of 600 to 1000° C. This baking allows the active material to have a layered structure with high crystallinity. The baking temperature and time can be freely selected depending on a desired degree of crystallization and a desired particle size of the active material.

Another aspect of the present invention is directed to an all-solid-state lithium secondary battery including the active material and a sulfide solid electrolyte.

A mixture of the active material and the sulfide solid electrolyte is used to produce a hybrid electrode. A conductive agent may be added to improve the electronic conductivity of the hybrid electrode. The solid electrolyte, the active material, and the conductive agent may be mixed together by a dry or wet process. However, any process that allows for uniform distribution of the constituent particles and can improve the contact between the particles may be used without particular limitation.

The shape of the hybrid electrode may vary according to the intended purpose of the battery. For example, the mixture in the form of a powder may be applied to the top of the solid electrolyte. Alternatively, the mixture may be added with a binder and coated on the surface of a metal sheet, such as an Al, Cu, Ti or SUS sheet. In this case, the hybrid electrode may take the form of a sheet.

Examples of sulfide solid electrolytes suitable for use in the production of the hybrid electrode include sulfide-based network modifiers, such as $Li_2S$, and sulfide-based network formers, such as $P_2S_5$, $B_2S_3$, $SiS_2$, and $GeS_2$. These sulfide solid electrolytes may be used in the form of powders.

The solid electrolyte may be either amorphous or crystalline. The amorphous solid electrolyte may be synthesized by mixing a network modifier powder and a network former powder in a stoichiometric ratio and melt-cooling or mechanically milling the mixture. Thereafter, the amorphous solid electrolyte may be optionally baked. This baking is performed to improve the conductivity of the solid electrolyte. The crystalline solid electrolyte is prepared through a solid-state reaction. Specifically, the crystalline solid electrolyte may be prepared by mixing sulfide powders in a stoichiometric ratio and baking the mixture under vacuum or in an inert gas atmosphere at high temperature. The solid electrolyte is used in an electrolyte layer. After mixing with the active material, and optionally a conductive agent and a binder, the solid electrolyte may also be used to provide ionic conduction paths in the hybrid electrode.

BEST MODE FOR CARRYING OUT THE INVENTION

The present invention will be explained in more detail with reference to the following examples. However, these examples are provided for illustrative purposes and do not serve to limit the scope of the invention. It will be obvious to those skilled in the art that and that various modifications and changes are possible without departing from the scope and spirit of the invention.

In Synthesis Examples 1-3, active materials were synthesized in which oxide active materials were surface coated with various compositions of lithium compounds simultaneously with the synthesis of the oxide active materials.

Synthesis Example 1: Preparation of Active Materials in which Lithium Cobalt Oxides ($Li_{1+x}CoO_2$) were Surface Coated with Various Compositions of Lithium Compounds Lithium nitrate ($LiNO_3$) and cobalt nitrate hexahydrate ($Co(NO_3)_2 \cdot 6H_2O$) in a molar ratio of 1.1-1.3:1 were dissolved in water. The water was completely removed by evaporation with stirring, followed by baking in air at 800° C. for 5 h, affording an active material.

Synthesis Example 2: Preparation of Active Materials in which Lithium Cobalt Oxide ($LiCoO_2$) was Surface Coated with Lithium Compounds from Various Lithium Precursors The procedure of Synthesis Example 1 was repeated except that lithium hydroxide (LiOH) and lithium acetate ($CH_3COO$—Li) were used instead of lithium nitrate ($LiNO_3$).

Synthesis Example 3 Preparation of Lithium Nickel Cobalt Oxide ($LiNi_{0.02}Co_{0.98}O_2$) as Replacement for the Lithium Cobalt Oxide and Active Materials in which the Lithium Nickel Cobalt Oxide was Surface Coated with Lithium Oxide The procedure of Synthesis Example 1 was repeated except that nickel nitrate hexahydrate ($Ni(NO_3)_2 \cdot 6H_2O$) and cobalt nitrate hexahydrate ($Co(NO_3)_2 \cdot 6H_2O$) (0.02:0.98 molar ratio) were used instead of cobalt nitrate hexahydrate ($Co(NO_3)_2 \cdot 6H_2O$).

In Synthesis Examples 4 and 5, active materials were prepared in which synthesized oxide active materials were surface coated with various compositions of lithium compounds.

Synthesis Example 4: Coating of Synthesized Lithium Cobalt Oxide Active Material with Lithium Compounds The amount of lithium compounds to be coated was previously calculated based on the weight of a synthesized oxide active material. Lithium precursors were dissolved in amounts in water. The amounts of the lithium precursors were determined based on the calculated amount. After stirring for about 1 h, the oxide active material was dispersed in the solution under gentle heating. The dispersion was completely dried, followed by baking at 600° C. for 5 h, affording an active material.

Synthesis Example 5: Surface Coating of Synthesized Commercial Lithium Nickel-Cobalt-Manganese Oxide Active Material ($Li[Ni_{0.6}Co_{0.2}Mn_{0.2}]O_2$)

The procedure of Synthesis Example 4 was repeated except that the synthesized lithium nickel-cobalt-manganese oxide active material was used instead of the lithium cobalt oxide active material.

Example 1: Fabrication of All-Solid-State Cells (1) Preparation of Sulfide Solid Electrolyte $Li_2S$ and $P_2S_5$ powders were subjected to mechanical milling (MM) in a zirconia milling pot to synthesize an amorphous solid electrolyte. For improved ionic conductivity, subsequent baking in an argon atmosphere at 200-300° C. afforded a glass-ceramic powder.

(2) Production of Hybrid Electrodes

The sulfide solid electrolyte ($78Li_2S$-$22P_2S_5$), each of the cathode active materials synthesized in Synthesis Examples 1-5, and a conductive agent (super P-carbon) in a weight ratio of 58.8:39.2:2 were dry mixed using a mortar and pestle in a glove box under an argon atmosphere. After addition of heptane, wet mixing was performed for 30 min. Heptane is substantially unreactive with the solid electrolyte. The mixture may be cast to produce a hybrid electrode in the form of a sheet. In this case, a binder is added to the mixture. The mixture was applied onto a collector, such as a metal or carbon fiber sheet, or to the surface of an electrolyte in the course of cell fabrication, followed by drying at 100-200° C.

(3) Bulk Cell Fabrication

The sulfide solid electrolyte was pressurized at 1 ton in a mold to form a thin electrolyte layer. The hybrid electrode and a carbon fiber sheet as a collector were sequentially attached to the electrolyte layer and pressurized at 4 tons. Subsequently, an indium foil as a counter electrode was attached opposite the hybrid electrode and pressurized at 3 tons to fabricate a bulk cell in the form of a circular pellet with a 16 mm diameter. The bulk cell was assembled into a 2032 SUS coin cell. The physical properties of the coin cell were evaluated.

Experimental Example 1

The surface morphologies of the lithium cobalt oxides synthesized in Synthesis Examples 1 and 4, each of which was surface coated with a lithium compound, were compared.

Figure 1:
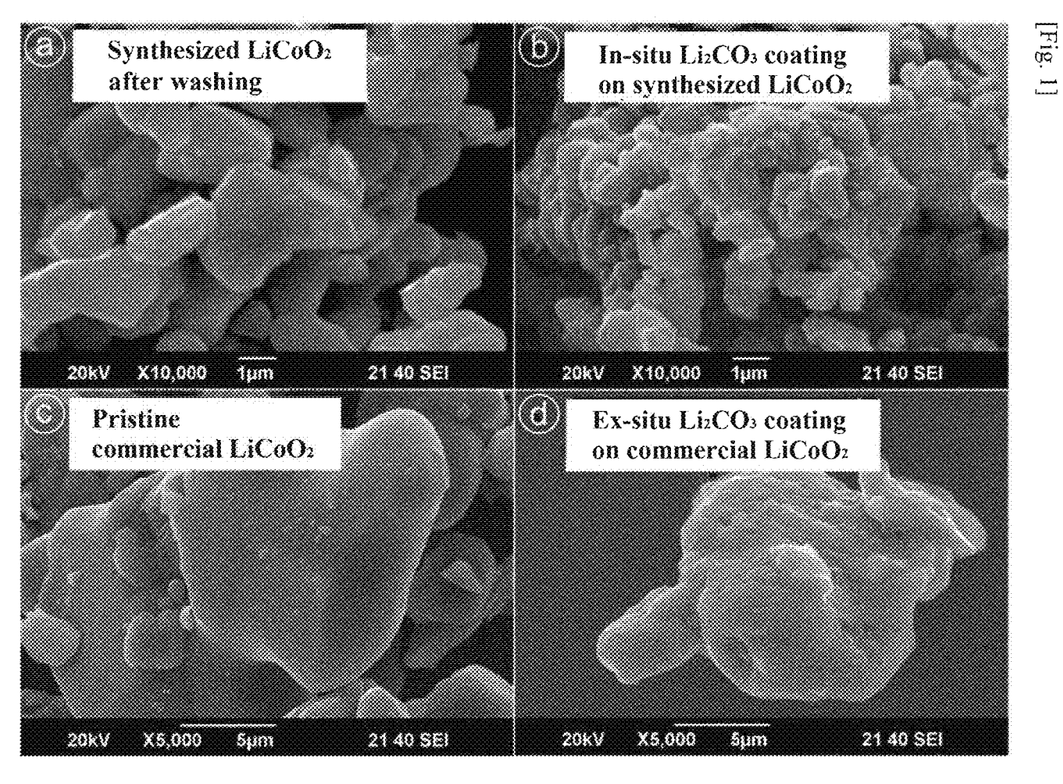
FIG. 1 shows SEM images of lithium cobalt oxide active materials coated with $Li_2CO_3$ as a lithium compound, which were synthesized by different methods in Synthesis Examples 1 (ⓑ in-situ) and 4 (ⓓ ex-situ), and comparative SEM images of surface-uncoated lithium cobalt oxide active materials (ⓐ and ⓒ).

FIG. 1 shows SEM images of the lithium cobalt oxide active materials coated with $Li_2CO_3$ as a lithium compound, which were synthesized by different methods in Synthesis Examples 1 (ⓑ in-situ) and 4 (ⓓ ex-situ), and comparative SEM images of surface-uncoated lithium cobalt oxide active materials (ⓐ and ⓒ).

Specifically, ⓐ, ⓑ, ⓒ, and ⓓ of FIG. 1 show the synthesized lithium cobalt oxide active material from which the surface coating layer was removed by washing, the synthesized lithium cobalt oxide active material on which the lithium oxide coating layer was formed, a pristine commercial lithium cobalt oxide, and a commercial lithium cobalt oxide on which a surface coating layer was formed by subsequent processing, respectively.

Due to the presence of the particles of the lithium compound distributed on the surface of the oxide active material, the active material in which the lithium compound was coated without subsequent processing simultaneously with the synthesis of the oxide active material (in-situ) (ⓑ of FIG. 1) had a higher surface roughness than the synthesized lithium cobalt oxide active material after washing (ⓐ of FIG. 1).

Likewise, due to the formation of the lithium compound surface coating layer, the active material in which the lithium compound was coated on the commercial lithium cobalt oxide by subsequent processing (ex-situ) (ⓓ of FIG. 1) had a higher surface roughness than the commercial lithium cobalt oxide before coating (ⓒ of FIG. 1).

Experimental Example 2

The crystal structures of the oxide active material surface coated with the lithium compound without subsequent processing (in-situ), which was synthesized in Synthesis Example 1, the oxide active material surface coated with the lithium compound through subsequent processing (ex-situ), which was synthesized in Synthesis Example 4, and the respective oxide active materials before coating were compared by XRD analysis. The results are shown in FIG. 2.

Figure 2:
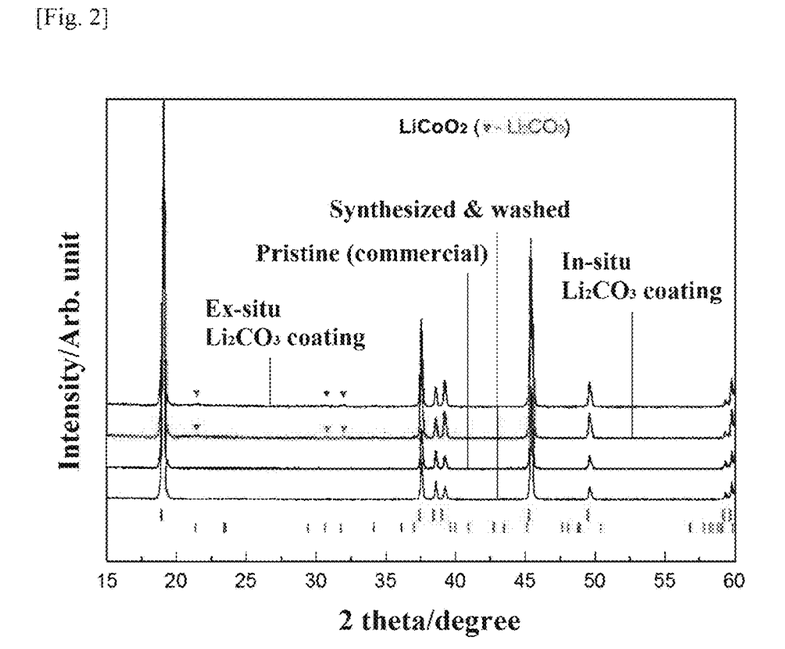
FIG. 2 shows comparative XRD patterns showing the crystal structures of an oxide active material surface coated with a lithium compound without subsequent processing (in-situ), which was synthesized in Synthesis Example 1, an oxide active material surface coated with a lithium compound through subsequent processing (ex-situ), which was synthesized in Synthesis Example 4, and the respective oxide active materials before coating.

As shown in FIG. 2, the XRD patterns of the synthesized oxide active material whose surface was made clean by washing ("Synthesized & washed") and the commercial lithium cobalt oxide ("Pristine (commercial)") did not show phases other than the lithium cobalt oxide.

In contrast, the XRD patterns of the in-situ coated oxide active material and the ex-situ coated oxide active material clearly showed weak peaks corresponding to lithium carbonate ($Li_2CO_3$) as the lithium compound, together with the strong peaks corresponding to the crystalline lithium cobalt oxide. The weak peaks appeared to indicate the presence of impurities. When baking is performed in a carbon dioxide ($CO_2$) atmosphere, remaining lithium reacts with the carbon dioxide to give lithium carbonate.

Experimental Example 3

The structures of the oxide active material surface coated with the lithium compound without subsequent processing (in-situ), which was synthesized in Synthesis Example 1, the oxide active material surface coated with the lithium compound through subsequent processing (ex-situ), which was synthesized in Synthesis Example 4, and the respective oxide active materials before coating were analyzed and compared by IR spectroscopy. The IR spectra are shown FIG. 3.

Figure 3:
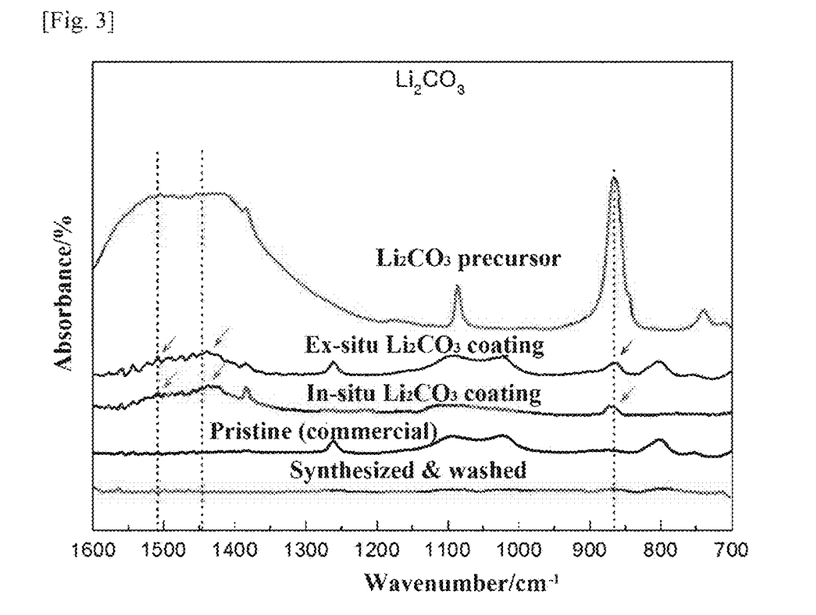
FIG. 3 shows comparative IR spectra showing the structures of an oxide active material surface coated with a lithium compound without subsequent processing (in-situ), which was synthesized in Synthesis Example 1, an oxide active material surface coated with a lithium compound through subsequent processing (ex-situ), which was synthesized in Synthesis Example 4, and the respective oxide active materials before coating.

As shown in FIG. 3, peaks at around 860 cm$^{-1}$, 1490 cm$^{-1}$, and 1520 cm$^{-1}$ corresponding to lithium carbonate were found in both the oxide active material surface coated without subsequent processing (in-situ) and the oxide active material surface coated through subsequent processing (ex-situ). None of the peaks were observed in the synthesized & washed lithium cobalt oxide and the pristine (commercial) lithium cobalt oxide.

Experimental Example 4

The electrochemical charge/discharge characteristics of the lithium cobalt oxide active materials in which the ratio between lithium and cobalt was controlled, which were synthesized in Synthesis Example 1, were compared.

Figure 4:
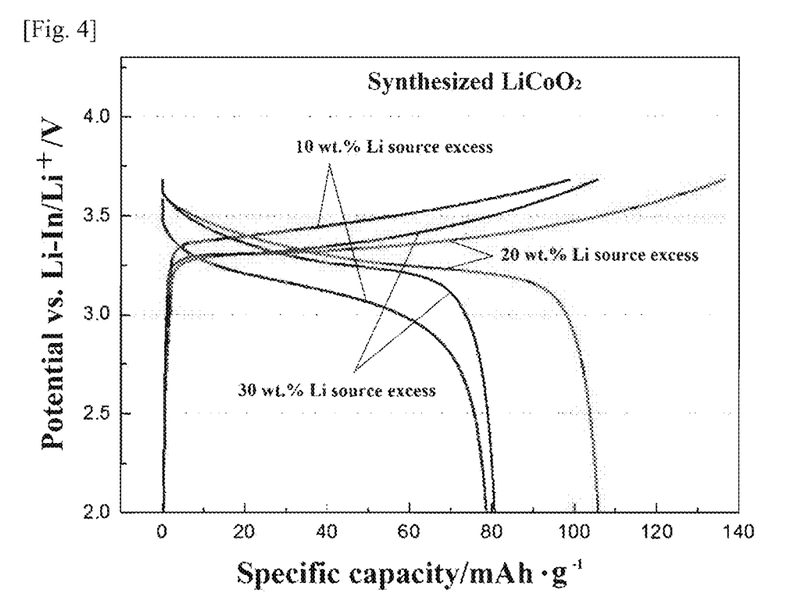
FIG. 4 shows charge/discharge curves of all-solid-state batteries employing lithium cobalt oxide active materials synthesized using controlled amounts (10 wt. %, 20 wt. %, and 30 wt. %) of a lithium precursor in Synthesis Example 1.

The amounts of the lithium precursor as a lithium source used to synthesize the oxide active materials were gradually increased to 10 wt. %, 20 wt. %, and 30 wt. %. The excess lithium remaining after the synthesis of the oxide active materials acts as an impurity to form lithium carbonate. The amount of the residual lithium determines the amount of the lithium carbonate present on the surface of the corresponding lithium cobalt oxide active material. The lithium carbonate coating layers are responsible for the different electrochemical properties shown in FIG. 4.

Experimental Example 5

The electrochemical charge/discharge characteristics of an all-solid-state battery employing the oxide active material (lithium:cobalt=1.2:1) coated with the lithium compound, which was synthesized in Synthesis Example 1, were compared with those of an all-solid-state battery employing the surface-uncoated lithium cobalt oxide active material.

Generally, the lithium precursor as a lithium source is used in an excessive amount to compensate for loss caused by the volatilization of lithium during high-temperature synthesis. Depending on the atmosphere, residual lithium reacts with other precursors to form lithium compounds, mainly lithium carbonate. In a lithium secondary battery using a liquid electrolyte, the lithium carbonate acts as an impurity, which is a cause of poor cell performance.

Figure 5:
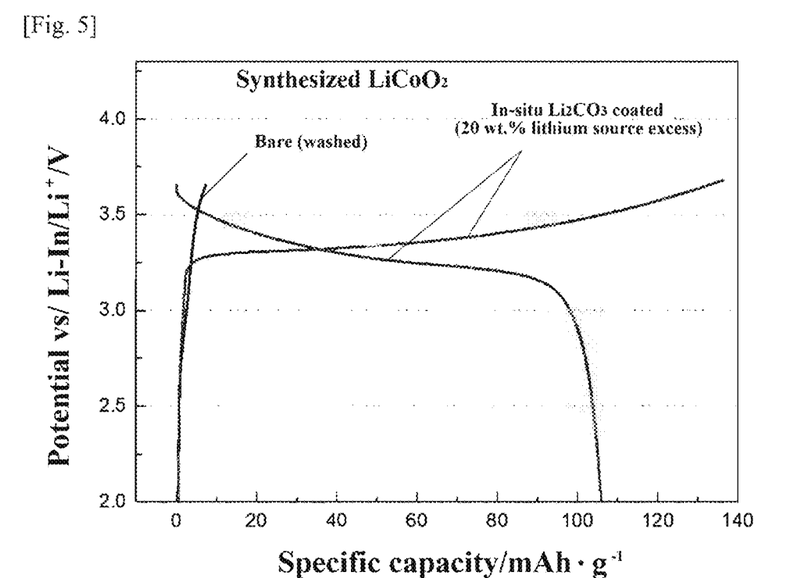
FIG. 5 shows electrochemical charge/discharge curves of an all-solid-state battery employing a lithium cobalt oxide active material (Li:Co=1.2:1) coated with a lithium compound, which was synthesized in Synthesis Example 1, and an all-solid-state battery employing the surface-uncoated lithium cobalt oxide active material.

In contrast, in a lithium secondary battery using a solid electrolyte, the lithium carbonate suppresses the formation of a resistive layer by diffusion of the transition metal element from the oxide active material or the formation of a lithium depletion layer due to different potentials and increases the contact area between the active material and the electrolyte to induce large diffusion paths of lithium ions, ensuring smooth charging/discharging of the batteries, as shown in FIG. 5.

Experimental Example 6

Figure 6:
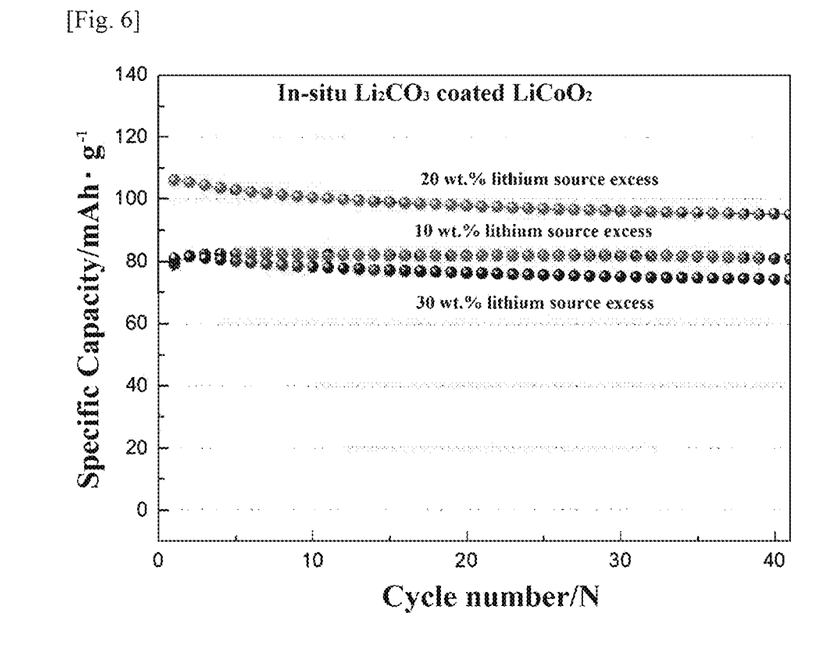
FIG. 6 is a graph comparing the charge/discharge life characteristics of all-solid-state batteries employing lithium cobalt oxide active materials coated with a lithium compound with varying amounts of lithium, which were synthesized in Synthesis Example 1.

The electrochemical charge/discharge life characteristics of all-solid-state batteries employing the lithium cobalt oxides coated with the lithium compound, which were synthesized using different amounts of the lithium precursor in Synthesis Example 1, were measured and the results are shown in FIG. 6.

As can be seen from FIG. 5, sufficient charging/discharging did not occur in the all-solid-state battery employing the uncoated lithium cobalt oxide, whereas the lithium cobalt oxide active material surface coated with the lithium compound showed electrochemically stable life characteristics. FIG. 6 reveals that the charge/discharge characteristics and life characteristics of the batteries varied depending on the amount of the lithium oxide coated.

Experimental Example 7

Figure 7:
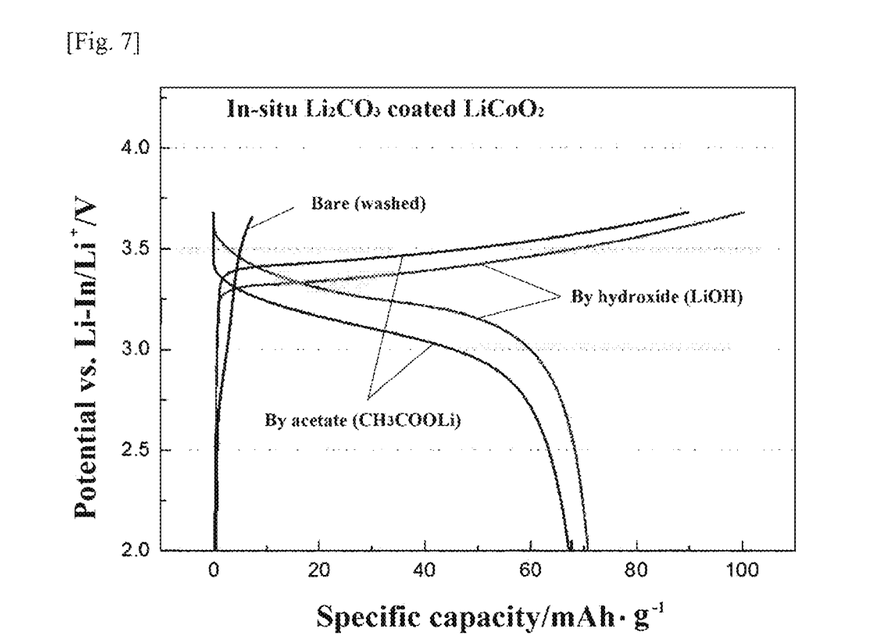
FIG. 7 shows electrochemical charge/discharge curves of all-solid-state batteries employing lithium cobalt oxide active materials synthesized using different precursors in Synthesis Example 2.
Figure 8:
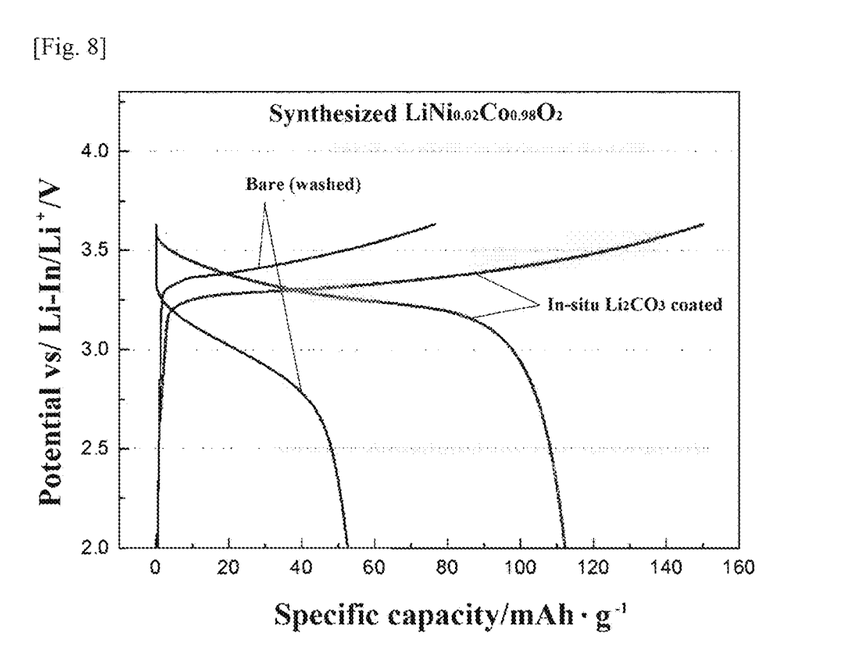
FIG. 8 shows charge/discharge curves of an all-solid-state battery employing a surface-coated lithium nickel cobalt oxide active material synthesized in Synthesis Example 3 and an all-solid-state battery employing a surface-uncoated lithium nickel cobalt oxide active material.
Figure 9:
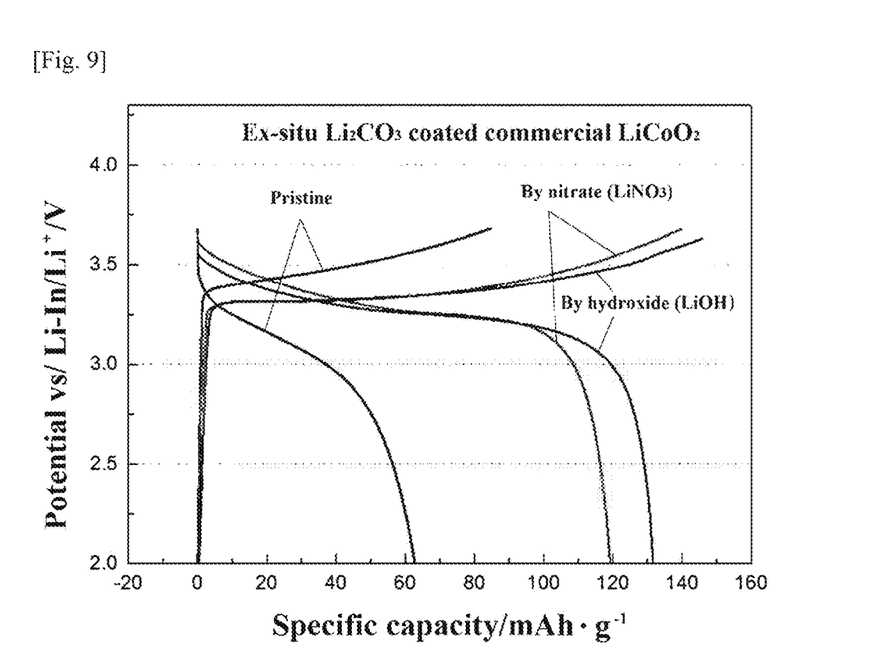
FIG. 9 shows charge/discharge curves of all-solid-state batteries employing active materials including a commercial lithium cobalt oxide surface coated with lithium compounds from different precursors, which were synthesized in Synthesis Example 4, and an all-solid-state battery employing the commercial lithium cobalt oxide active material before surface coating.
Figure 10:
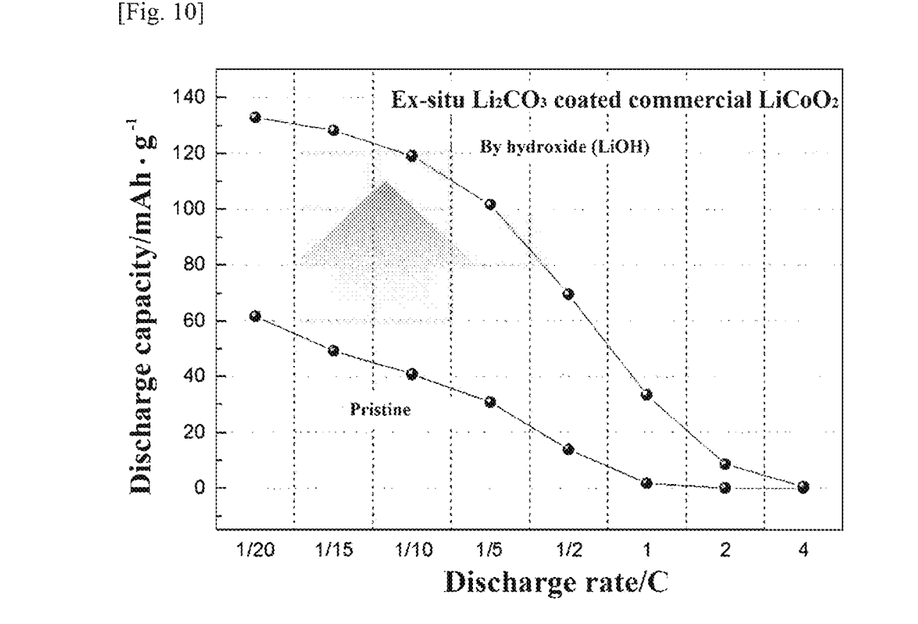
FIG. 10 is a graph showing capacity characteristics an all-solid-state battery employing an active material including a commercial lithium cobalt oxide surface coated with a lithium compound from a precursor, which was synthesized in Synthesis Example 4, and an all-solid-state battery employing the commercial lithium cobalt oxide active material before surface coating at different charge/discharge rates.
Figure 11:
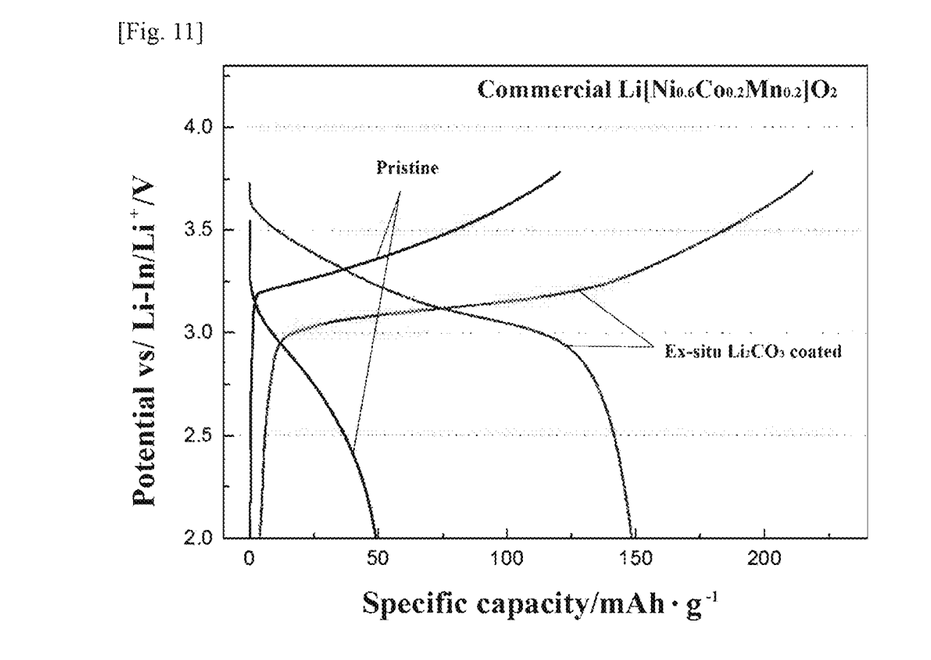
FIG. 11 shows charge/discharge curves of an all-solid-state battery employing an active material including a commercial lithium nickel-cobalt-manganese (6:2:2) oxide surface coated with a lithium compound, which was synthesized in Synthesis Example 5, and an all-solid-state battery employing the commercial lithium nickel-cobalt-manganese (6:2:2) oxide active material before surface coating.
Figure 12:
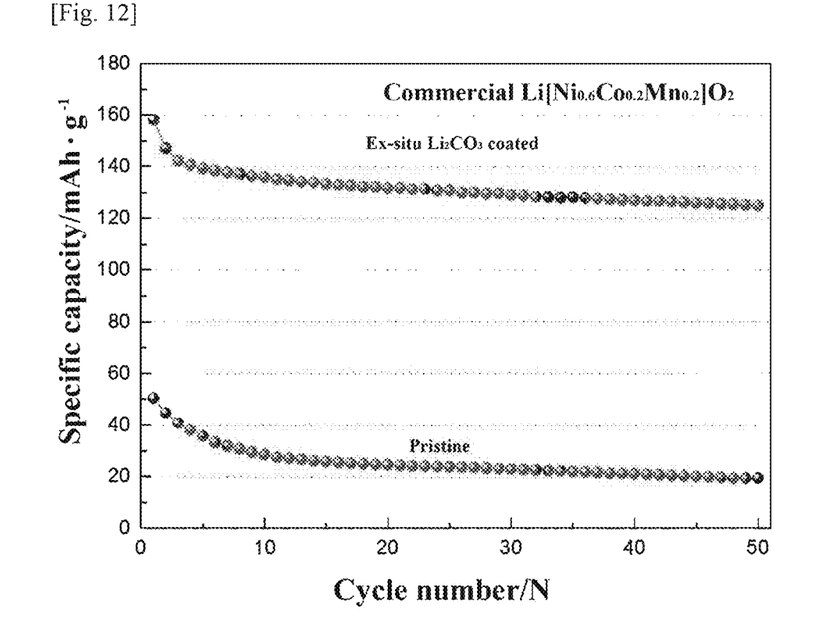
FIG. 12 is a graph showing charge/discharge life characteristics of an all-solid-state battery employing an active material including a commercial lithium nickel-cobalt-manganese (6:2:2) oxide surface coated with a lithium compound, which was synthesized in Synthesis Example 5, and an all-solid-state battery employing the commercial lithium nickel-cobalt-manganese (6:2:2) oxide active material before surface coating.

The electrochemical charge/discharge characteristics of all-solid-state batteries employing the lithium cobalt oxides synthesized using different lithium precursors in Synthesis Example 2 were measured and the results are shown in FIG. 7.

As shown in FIG. 7, the use of different lithium precursors did not cause problems in the surface coating of the lithium cobalt oxides with the lithium compound. These results lead to the conclusion that although there is a slight difference depending on the kind of the lithium precursor, the surface coating with the lithium compound suppresses the formation of a resistive layer by diffusion of the transition metal element from the oxide active material or the formation of a lithium depletion layer due to different potentials and increases the contact area between the active material and the electrolyte to induce large diffusion paths of lithium ions, ensuring normal charging/discharging of the batteries.

Experimental Example 8

The electrochemical charge/discharge characteristics of an all-solid-state battery employing the coated lithium nickel-cobalt oxide active material ($LiNi_{0.02}Co_{0.98}O_2$) synthesized in Synthesis Example 3 were compared with those of an all-solid-state battery employing the uncoated lithium nickel-cobalt oxide active material.

Like the lithium cobalt oxide active material, the lithium nickel-cobalt oxide active material showed different electrochemical charge/discharge characteristics before and after coating. These results reveal the applicability of other active materials as well as the lithium cobalt oxide active material of Synthesis Example 1 to all-solid-state batteries.

Experimental Example 9

The electrochemical charge/discharge characteristics of all-solid-state batteries employing the active materials including the commercial lithium cobalt oxide surface coated with lithium compounds from the different lithium precursors through subsequent processing, which were synthesized in Synthesis Example 4, were compared with those of an all-solid-state battery employing the commercial lithium cobalt oxide active material before coating.

From these result, it can be concluded that even when the commercial lithium cobalt oxide is surface coated with lithium compounds from different precursors as lithium sources, the surface coating with the lithium compounds suppresses the formation of a resistive layer by diffusion of the transition metal element from the oxide active material or the formation of a lithium depletion layer due to different potentials and increases the contact area between the active material and the electrolyte to induce large diffusion paths of lithium ions.

Experimental Example 10

The electrochemical high-rate charge/discharge characteristics of an all-solid-state battery employing the active material including the commercial lithium cobalt oxide surface coated with a lithium compound from lithium hydroxide as a lithium precursor, which was synthesized in Synthesis Example 4, were compared with those of an all-solid-state battery employing the commercial lithium cobalt oxide active material before surface coating.

These results show that the presence of the lithium compound on the surface of the oxide active material improves not only the life characteristics but also the high-rate characteristics of the battery, leading to improved power characteristics of the battery.

Experimental Example 11

The electrochemical charge/discharge characteristics of an all-solid-state battery employing the commercial lithium nickel-cobalt-manganese oxide active material surface coated with a lithium compound through subsequent processing, which was synthesized in Synthesis Example 5, and a solid electrolyte were compared with those of an all-solid-state battery employing the uncoated commercial lithium nickel-cobalt-manganese oxide active material.

A battery employing the commercial lithium nickel-cobalt-manganese oxide active material and a liquid electrolyte shows high capacities and stable charge/discharge characteristics. However, the all-solid-state battery employing the commercial lithium nickel-cobalt-manganese oxide active material without coating with a lithium compound through subsequent processing showed low capacities. In contrast, the all-solid-state battery employing the commercial lithium nickel-cobalt-manganese oxide active material coated with a lithium compound showed high capacities.

These results demonstrate that the lithium compound coating of not only the lithium cobalt oxide active material but also other active materials can contribute to an improvement in electrochemical characteristics.

Experimental Example 12

The electrochemical charge/discharge life characteristics of an all-solid-state battery employing the commercial lithium nickel-cobalt-manganese oxide active material surface coated with a lithium compound, which was synthesized in Synthesis Example 5, were compared with those of an all-solid-state battery employing the uncoated commercial lithium nickel-cobalt-manganese oxide active material.

The batteries were subjected to 50 repeated charge/discharge cycles under the same conditions in order to investigate how long the improved electrochemical characteristics of the all-solid-state battery employing the coated commercial lithium nickel-cobalt-manganese oxide active material, which had already been demonstrated in Experimental Example 11, lasted (i.e. the life characteristics of the all-solid-state battery). As a result, the battery employing the uncoated oxide active material showed very low capacities throughout the charge/discharge cycles the while the battery employing the surface-coated oxide active material maintained its high capacities even after 50 cycles of charge/discharge.

These results demonstrate that the lithium compound coating can also contribute to an improvement in electrochemical charge/discharge life characteristics.

INDUSTRIAL APPLICABILITY

The cathode active material for an all-solid-state lithium secondary battery according to the present invention has a structure in which a coating layer composed of a lithium compound surrounds the surface of oxide particles. This structure allows the coating layer act as a functional layer to suppress interfacial reactions between a sulfide solid electrolyte and the electrode, achieving markedly improved performance of the all-solid-state lithium secondary battery. Therefore, the cathode active material of the present invention is useful in industrial applications.

The invention claimed is:

1. A method for preparing an all-solid-state lithium secondary battery, comprising:
    (a) mixing a lithium precursor with a metal salt in a molar ratio of 1.10-1.50:1 and dissolving the mixture in distilled water to obtain a mixed solution;
    (b) drying the mixed solution with stirring under heating to evaporate the solvent and provide a dried product; and
    (c) preparing a cathode active material for the all-solid-state lithium secondary battery by baking the dried product at 600 to 1000° C.,
    wherein the cathode active material is represented by Formula 1:

$$Li_{1+X}(M)O_2 \qquad (1)$$

wherein M comprises at least one transition metal selected from Co, Ni, and Mn and X satisfies 0<X<1,
    a surface of the cathode active material is surrounded by a lithium compound coating layer, and
    the lithium compound coating layer is lithium carbonate, formed simultaneously with the synthesis of the cathode active material,
    the all-solid-state lithium secondary battery comprising a sulfide solid electrolyte.

2. The method according to claim 1, wherein in Formula 1, X is a real number ranging from 0.10 to 0.20.

3. The method according to claim 1, wherein the lithium precursor is selected from lithium nitrate, lithium hydroxide, lithium citrate, lithium acetate, lithium sulfate, and lithium carbonate and the metal salt is selected from nitrates, acetates, and citrates of transition metals, comprising Co, Ni, and Mn, and mixtures thereof.

4. The method according to claim 1, wherein (b) is carried out at a temperature of 40 to 250° C.

5. The method according to claim 1, wherein the lithium carbonate is formed when the baking is performed in a carbon dioxide ($CO_2$) or $CO_2$-containing gas atmosphere in (c).

6. The method according to claim 1, wherein M comprises Co.

7. The method according to claim 1, wherein M comprises Ni.

8. The method according to claim 1, wherein M comprises Mn.

9. The method according to claim 1, comprising mixing said lithium precursor with said metal salt in a molar ratio of 1.1-1.3:1 and dissolving the mixture in the distilled water to obtain the mixed solution.

* * * * *